(12) United States Patent
Nakayama et al.

(10) Patent No.: US 9,460,531 B2
(45) Date of Patent: Oct. 4, 2016

(54) EFFECT CONTROL DEVICE, EFFECT CONTROL METHOD, AND PROGRAM

(71) Applicant: SONY CORPORATION, Tokyo (JP)

(72) Inventors: Daisuke Nakayama, Chiba (JP); Tomonari Okada, Tokyo (JP)

(73) Assignee: Sony Corporation, Tokyo (JP)

( * ) Notice: Subject to any disclaimer, the term of this patent is extended or adjusted under 35 U.S.C. 154(b) by 210 days.

(21) Appl. No.: 13/894,214

(22) Filed: May 14, 2013

(65) Prior Publication Data

US 2013/0336598 A1    Dec. 19, 2013

(30) Foreign Application Priority Data

Jun. 13, 2012  (JP) ................ 2012-133787

(51) Int. Cl.
*G06K 9/36* (2006.01)
*G06T 11/60* (2006.01)
*G06T 11/20* (2006.01)

(52) U.S. Cl.
CPC .............. *G06T 11/60* (2013.01); *G06T 11/206* (2013.01)

(58) Field of Classification Search
USPC ......................................................... 382/284
See application file for complete search history.

(56) References Cited

U.S. PATENT DOCUMENTS

2010/0123785 A1    5/2010    Chen et al.

FOREIGN PATENT DOCUMENTS

JP        2004-295488    * 10/2004

OTHER PUBLICATIONS

English Computer Translated of JP 2004-295488, Oct. 2004.*

* cited by examiner

*Primary Examiner* — Duy M Dang
(74) *Attorney, Agent, or Firm* — Chip Law Group

(57) ABSTRACT

There is provided an effect control device including an effect control unit that controls an effect added to a target image based on information regarding a direction of a sound.

32 Claims, 4 Drawing Sheets

EFFECT CONTROL DEVICE, EFFECT CONTROL METHOD, AND PROGRAM

BACKGROUND

The present disclosure relates to an effect control device, an effect control method, and a program.

Technologies for adding an effect to an image (a still image or a moving image; the same applies herein throughout) have been known. As the technology for adding an effect to an image, a technology disclosed in WO 2008/111113 can be exemplified.

SUMMARY

For example, according to the technology disclosed in WO 2008/111113, an effect to be added to a sound selected by a user is added to a sound indicated by sound data to be reproduced and an effect which is to be added to an image and corresponds to the effect added to the selected sound is added to an image indicated by image data to be reproduced. Accordingly, for example, when the technology disclosed in WO 2008/111113 is used, there is a possibility that the effect corresponding to the effect to be added to a sound selected by the user can be added to an image.

However, for example, in the technology disclosed in WO 2008/111113, an effect corresponding to an effect to be added to a sound selected by the user is added to an image. Therefore, an effect corresponding to a sound, for example, an effect corresponding to a sound indicated by sound data to be reproduced, may not necessarily be added to an image.

It is desirable to provide a novel and improved effect control device, a novel and improved effect control method, and a novel and improved program capable of adding an effect based on a sound to a target image.

According to an embodiment of the present disclosure, there is provided an effect control device including an effect control unit that controls an effect added to a target image based on information regarding a direction of a sound.

Further, according to an embodiment of the present disclosure, there is provided an effect control method including controlling an effect added to a target image based on information regarding a direction of a sound.

Further, according to an embodiment of the present disclosure, there is provided a program causing a computer to perform controlling an effect added to a target image based on information regarding a direction of a sound.

According to the embodiments of the present disclosure, an effect based on a sound can be added to a target image.

DETAILED DESCRIPTION OF THE EMBODIMENTS

Figure 1:
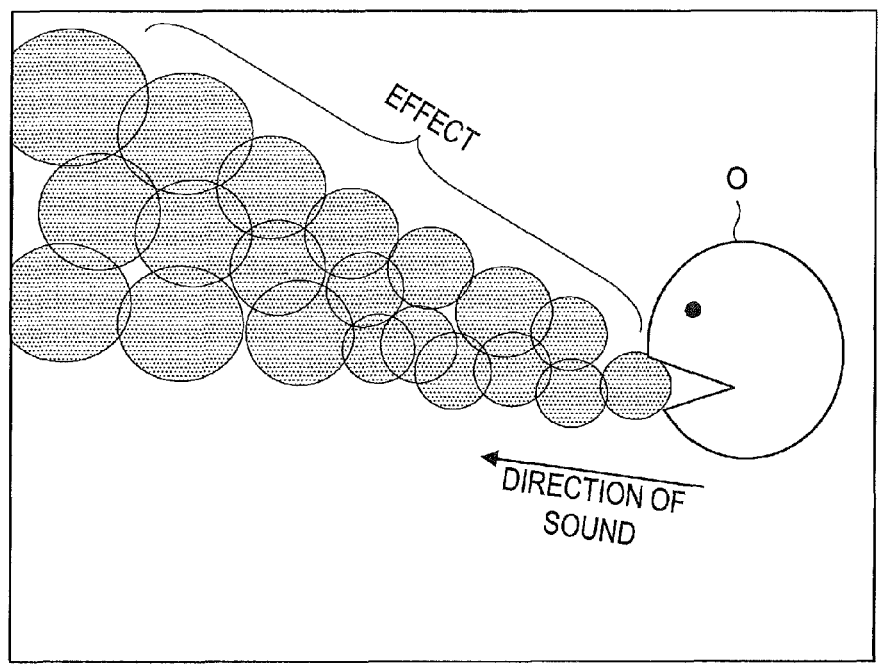
FIG. 1 is a diagram illustrating a first example of a process relevant to an effect control method in an effect control device according to an embodiment.

Hereinafter, preferred embodiments of the present disclosure will be described in detail with reference to the appended drawings. In the specification and the drawings, the same reference numerals are given to constituent elements having substantially the same functional configurations, and repeated description of the constituent elements is omitted.

Hereinafter, the description will be made in the following order.

1. Effect Control Method According to Embodiment
2. Effect Control Device According to Embodiment
3. Program According to Embodiment (Effect Control Method According to Embodiment)

Before the configuration of an effect control device according to an embodiment is described, first, an effect control method according to the embodiment will be described. Hereinafter, the effect control method according to this embodiment will be described giving an example in which the effect control device according to this embodiment performs a process relevant to the effect control method according to this embodiment.

The effect control device according to this embodiment controls an effect to be added to a target image based on information indicating the direction of a sound. For example, the effect control device according to this embodiment controls the effect to be added to the target image by combining an effect image indicated by the effect to be added to an image with the target image based on the information indicating the direction of the sound. For example, the effect control device according to this embodiment may combine the effect image with the target image on the same layer as the target image or may combine the effect image with the target image by superimposing the effect image of a layer different from that of the target image on a layer of the target image. Hereinafter, for example, as described above, the combination of the effect image on the target image indicates "addition of an effect to the target image" in some cases.

Here, the target image according to this embodiment refers to an image to which an effect is to be added. As the target image according to this embodiment, a captured image captured by an imaging unit (to be described below) can be exemplified when an external imaging device or the effect control device according to this embodiment includes the imaging unit (to be described below). The target image according to this embodiment is not limited to a captured image. For example, the target image according to this embodiment may be an image indicated by image data stored in a storage unit (to be described below) included in the effect control device according to this embodiment, an external recording medium, or an external device such as a server.

The information indicating the direction of a sound according to this embodiment refers to data indicating the direction of the sound. For example, the direction of a sound according to this embodiment is specified by comparing the position of the sound obtained by analyzing a sound signal at a first time point (for example, a time point at which a sound is generated or a time point at which a sound is first detected) and the position of the sound obtained by analyzing a sound signal at a second time point (a time point later than the first time point). For example, the position of a sound according to this embodiment is specified based on a deviation of the sound between sounds indicated by a plurality of sound signals indicating sounds collected by a plurality of microphones.

For example, a sound analysis process relevant to analysis of the sound signal, such as a process of specifying the position of a sound or a process of specifying the direction of a sound, may be performed by, for example, the effect control device according to this embodiment or a device external to the effect control device according to this embodiment.

The sound analysis process according to this embodiment is not limited to the process of specifying the position of a sound or the process of specifying the direction of a sound. For example, as the sound analysis process according to this embodiment, various processes such as a process of specifying a volume, a process of specifying the frequency of a sound, and a process of determining the class of a sound can be performed.

Here, a volume (for example, expressed in [dB]) according to this embodiment can be specified, for example, using sensitivity (for example, expressed in [V/Pa]) of a microphone generating a sound signal, a gain of an amplifier, or a voltage value (for example, expressed in [V]) of a sound signal. The frequency of a sound according to this embodiment can be specified, for example, using a fast Fourier transform. For example, the class of a sound according to this embodiment can be determined based on a result (for example, data indicating a frequency spectrum) obtained by specifying the frequency of a sound in a process of specifying the frequency of the sound and a lookup table in which frequency spectra and classes of sounds are associated with each other and stored. None of the process of specifying a volume, the process of specifying the frequency of a sound, and the process of determining the class of a sound according to this embodiment is limited to the above-described examples, but any process capable of specifying a volume, the frequency of a sound, or the class of a sound may be performed.

The effect control device capable of performing the sound analysis process according to this embodiment and/or an external device (hereinafter, also referred to as "a device performing the sound analysis process") capable of performing the sound analysis process can obtain data indicating a processing result of the sound analysis process, such as information indicating the direction of a sound, information (data) indicating the position of a sound, information (data) indicating a volume, information (data) indicating the frequency of a sound, or class information (data) indicating the class of a sound by performing the sound analysis process according to this embodiment. When the data indicating the various processing results is obtained, the device performing the sound analysis process performs the sound analysis process in the order of the process of specifying the position of a sound, the process of specifying the volume, the process of specifying the frequency of the sound, the process of determining the class of the sound, and the process of specifying the direction of the sound. However, the order in which the device performing the sound analysis process performs the processes is not limited to the above order. For example, the device performing the sound analysis process may selectively perform only a specific sound analysis process to acquire information used in a process relevant to the effect control method by the effect control device according to this embodiment.

When the effect control device according to this embodiment performs the sound analysis process, the effect control device according to this embodiment performs a process relevant to the effect control method according to this embodiment based on data indicating the processing result of the sound analysis process in the own device (the effect control device according to this embodiment). Further, when the external device performs the sound analysis process, the effect control device according to this embodiment performs the process relevant to the effect control method according to this embodiment based on data indicating the processing result of the sound analysis process in the external device.

Hereinafter, specific examples of the process relevant to the effect control method in the effect control device according to this embodiment will be described.

(1) First Example

For example, the effect control device according to this embodiment adds, to a target image, an effect based on the direction of a sound indicated by the information regarding the direction of the sound.

FIG. 1 is a diagram illustrating a first example of the process relevant to the effect control method in the effect control device according to this embodiment. Here, FIG. 1 illustrates an example of an image in which the effect based on the direction of the sound indicated by the information regarding the direction of the sound is added to a target image by the effect control device according to this embodiment.

For example, as illustrated in FIG. 1, the effect control device according to this embodiment adds an effect to the target image in the direction of the sound indicated by the information regarding the direction of the sound.

Here, FIG. 1 illustrates the example in which the effect control device according to this embodiment detects a person as a specific object from the target image and adds the effect in the direction of the sound indicated by the information regarding the direction of the sound from a specific position (the mouth of the person in the example of FIG. 1) of the detected object O. The position at which the effect control device according to this embodiment adds the effect in the target image is not limited to the specific position in the object detected from the target image. For example, the effect control device according to this embodiment may add the effect in the direction of the sound indicated by the information regarding the direction of the sound from a position set in the target image. The set position may be, for example, a predefined fixed position or a position set by a user or the like.

The effect control device according to this embodiment adds the effect of a predetermined form to the target image. FIG. 1 illustrates the example in which an effect of a bubble form is added to the target image.

Here, for example, the effect of a preset shape is exemplified as the effect of the predetermined form according to this embodiment, but the effect of the predetermined form according to this embodiment is not limited to the above effect. For example, the effect control device according to this embodiment may add the effect of a form corresponding to the class of the sound indicated by class information to the target image based on the class information regarding the class of the sound corresponding to the information regarding the direction of the sound.

When the effect of the form corresponding to the class of the sound indicated by the class information is added to the target image, the effect control device according to this embodiment specifies image data (hereinafter referred to as "effect image data") which corresponds to the class of the sound indicated by the class information and indicates the effect image, for example, using the lookup table in which classes of the sound and the image data indicating the effect image are associated with each other. For example, the effect control device according to this embodiment adds the effect of the form corresponding to the class of the sound indicated by the class information to the target image by combining the effect image indicated by the specified effect image data with the target image.

For example, the effect control device according to this embodiment may detect a specific object (for example, a person, a moving body such as an airplane or an automobile, an object with a specific form) from the target image and add the effect of the form corresponding to the form of the detected object to the target image. Examples of the effect of the form corresponding to the form of the detected object include an effect imitating the outer appearance of the detected object and an effect simplifying the outer appearance of the detected object. For example, the effect control device according to this embodiment may specify the effect image data corresponding to the detected object using a lookup table in which kinds of the detected object are associated with the effect image data and add the effect of the form corresponding to the detected object to the target image.

For example, as illustrated with reference to FIG. 1, the effect control device according to this embodiment adds the effect based on the direction of the sound indicated by the information regarding the direction of the sound to the target image. For example, by adding an effect such as the effect illustrated in FIG. 1 to the target image, the user viewing the target image to which the effect is added can visually recognize the direction of the sound due to the effect added to the target image. In the effect control device according to this embodiment, the process based on the information regarding the direction of the sound is not, of course, limited to the process described above, and the example in which the effect based on the direction of the sound indicated by the information regarding the direction of the sound is added to the target image is not, of course, limited to the example illustrated in FIG. 1.

(2) Second Example

The process relevant to the effect control method in the effect control device according to this embodiment is not limited to the process based on the information regarding the direction of the sound, as described above in the first example. For example, the effect control device according to this embodiment can control an effect added to a target image based on information regarding the direction of a sound and information regarding positions of the sound.

More specifically, as in the above-described first example, the effect control device according to this embodiment adds, for example, the effect based on the direction of the sound indicated by the information regarding the direction of the sound to the target image. Further, the effect control device according to this embodiment adds an effect to a position which is present in the target image and corresponds to the position of the sound indicated by the information regarding the position of the sound.

Figure 2:
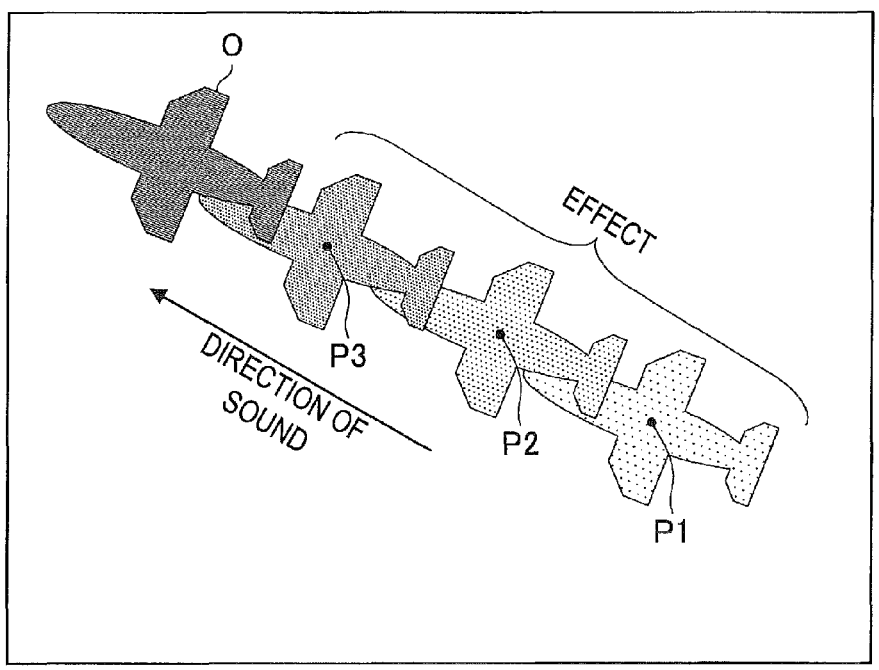
FIG. 2 is a diagram illustrating a second example of the process relevant to the effect control method in the effect control device according to the embodiment.

FIG. 2 is a diagram illustrating a second example of the process relevant to the effect control method in the effect control device according to this embodiment. Here, FIG. 2 illustrates an example of an image in which an effect based on the direction of a sound indicated by the information regarding the direction of the sound and the positions of the sound indicated by the information regarding the positions of the sound is added to a target image by the effect control device according to this embodiment. P1, P2, and P3 illustrated in FIG. 2 indicate examples of positions which are present on the target image and correspond to the positions of the sound indicated by the information regarding the positions of the sound.

For example, the effect control device according to this embodiment adds an effect to a target image in the direction of a sound indicated by the information regarding the direction of the sound, as in FIG. 1. Further, FIG. 2 illustrates an example in which the effect control device according to this embodiment adds an effect of an airplane form as an effect of a predetermined form to the target image.

The effect control device according to this embodiment specifies the positions P1, P2, and P3 which are present on the target image and correspond to the positions of the sound indicated by the information regarding the positions of the sound based on the information regarding the position of the sound. Here, the position on the target image according to this embodiment is expressed by, for example, coordinates (the same applies hereinafter). The effect control device according to this embodiment specifies the positions which are present on the target image and correspond to the positions indicated by the information regarding the positions of the sound, for example, by determining the coordinates in the target image.

For example, when the target image is a captured image and the sounds indicated by the information regarding the positions of the sound are sounds collected by a plurality of microphones (an example of a sound collection device) included in an imaging device (for example, the effect control device according to this embodiment or a device external to the effect control device according to this embodiment) capturing the captured image, the positions of the sound indicated by the information regarding the positions of the sound and regarding the positions of the sound in a valid angle of view in the imaging device capturing the captured image are determined as the positions on the target image. In the above-described case, for example, the effect control device according to this embodiment does not use the information regarding the positions of the sound and regarding the positions of the sound not in a valid angle of view in the imaging device capturing the captured image. That is, in the above-described case, the effect control device according to this embodiment does not add, to the target image, an effect based on the information regarding the positions of the sound and regarding the positions of the sound not in a valid angle of view in the imaging device capturing the captured image.

The process of specifying the positions which are present on the target image and correspond to the positions indicated by the information regarding the positions of the sound in the effect control device according to this embodiment is not limited to the above-described process. For example, based on the position of the specific object detected in the target image and the direction of the sound indicated by the information regarding the direction of the sound, the effect control device according to this embodiment specifies a straight line, of which an inclination indicates the direction of the sound and which passes through the position of the detected specific object, in the target image. For example, based on a position relation between the straight line specified in the target image and the position at each time point indicated by the information regarding the position of the sound, the effect control device according to this embodiment may determine any positions on the straight line in the specified target image as the positions P1, P2, and P3.

For example, as illustrated with reference to FIG. 2, the effect control device according to this embodiment adds, to the target image, an effect based on the direction of the sound indicated by the information regarding the direction of the sound and the positions of the sound indicated by the information regarding the positions of the sound. For example, by adding the effect, as illustrated in FIG. 2, to the target image, the user viewing the target image to which the effect is added can visually recognize the direction of the sound and the positions of the sound due to the effect added to the target image. In the effect control device according to this embodiment, the process based on the information regarding the direction of the sound and the information regarding the positions of the sound is not, of course, limited to the process described above, and the example in which an effect based on the direction of the sound indicated by the information regarding the direction of the sound and the positions of the sound indicated by the information regarding the positions of the sound is added to the target image is not, of course, limited to the example illustrated in FIG. 2.

(3) Third Example

The process relevant to the effect control method in the effect control device according to this embodiment is not limited to the process described above in the first example and the process described above in the second example. For example, the effect control device according to this embodiment can control an effect added to a target image based on information regarding the direction of a sound and information regarding the frequency of the sound.

More specifically, as in the above-described first example, the effect control device according to this embodiment adds, for example, the effect based on the direction of the sound indicated by the information regarding the direction of the sound to the target image. Further, the effect control device according to this embodiment adds an effect of a color corresponding to each frequency of the sound indicated by the information regarding the frequency of the sound to the target image.

Figure 3:
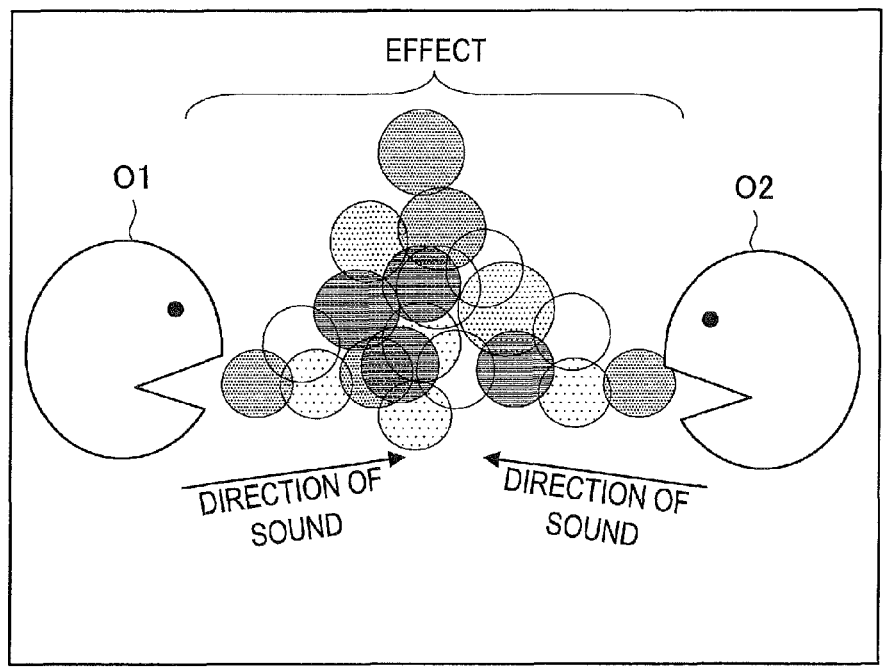
FIG. 3 is a diagram illustrating a third example of the process relevant to the effect control method in the effect control device according to the embodiment.

FIG. 3 is a diagram illustrating a third example of the process relevant to the effect control method in the effect control device according to this embodiment. Here, FIG. 3 illustrates an example of an image in which the effect based on the direction of the sound indicated by the information regarding the direction of the sound and the frequency of the sound indicated by the information regarding the frequency of the sound is added to the target image by the effect control device according to this embodiment.

For example, the effect control device according to this embodiment adds the effect to the target image in the direction of the sound indicated by the information regarding the direction of the sound, as in FIG. 1. Further, FIG. 3 illustrates an example in which the effect control device according to this embodiment adds an effect of a bubble form as an effect of a predetermined form to the target image, as in FIG. 1.

The effect control device according to this embodiment specifies the frequency of the sound corresponding to the sound indicated by the information regarding the direction of the sound based on the information regarding the frequency of the sound. Further, the effect control device according to this embodiment adds, to the target image, the effect (which is an example of an effect of a predetermined form) of the bubble form to which a color corresponding to each specified frequency of the sound is attached.

Here, for example, the effect control device according to this embodiment specifies a color corresponding to the frequency of the sound indicated by the information regarding the frequency of the sound, using a lookup table in which the frequencies of the sound and the colors are associated with each other. Then, for example, the effect control device according to this embodiment adds the effect based on the information regarding the direction of the sound and the information regarding the frequency of the sound to the target image by attaching the specified color to the effect image indicated by the effect image data and combining the effect image to which the color is attached with the target image.

For example, as illustrated with reference to FIG. 3, the effect control device according to this embodiment adds, to the target image, the effect based on the direction of the sound indicated by the information regarding the direction of the sound and the frequency of the sound indicated by the information regarding the frequency of the sound. For example, by adding the effect, as illustrated in FIG. 3, to the target image, the user viewing the target image to which the effect is added can visually recognize the direction of the sound and the pitch of the sound (or the frequency of the sound) due to the effect added to the target image. In the effect control device according to this embodiment, the process based on the information regarding the direction of the sound and the information regarding the frequency of the sound is not, of course, limited to the process described above, and the example in which the effect based on the direction of the sound indicated by the information regarding the direction of the sound and the frequency of the sound indicated by the information regarding the frequency of the sound is added to the target image is not, of course, limited to the example illustrated in FIG. 3.

(4) Fourth Example

The process relevant to the effect control method in the effect control device according to this embodiment is not limited to the process described above in the first example to the process described above in the third example. For example, the effect control device according to this embodiment can control an effect added to a target image based on information regarding the direction of a sound and information regarding a volume.

More specifically, as in the above-described first example, the effect control device according to this embodiment adds, for example, the effect based on the direction of the sound indicated by the information regarding the direction of the sound to the target image. Further, the effect control device according to this embodiment adds an effect of a magnitude corresponding to a volume indicated by the information regarding the volume to the target image.

Figure 4:
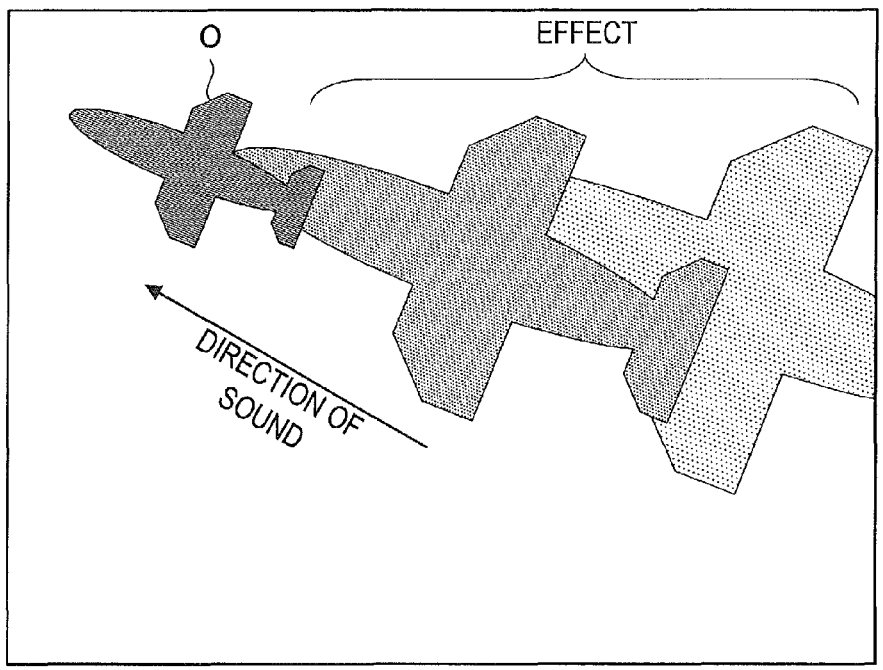
FIG. 4 is a diagram illustrating a fourth example of the process relevant to the effect control method in the effect control device according to the embodiment.

FIG. 4 is a diagram illustrating a fourth example of the process relevant to the effect control method in the effect control device according to this embodiment. Here, FIG. 4 illustrates an example of an image in which the effect based on the direction of the sound indicated by the information regarding the direction of the sound and the volume indicated by the information regarding the volume is added to the target image by the effect control device according to this embodiment.

For example, the effect control device according to this embodiment adds the effect to the target image in the direction of the sound indicated by the information regarding the direction of the sound, as in FIG. 1. Further, FIG. 4 illustrates an example in which the effect control device according to this embodiment adds an effect of an airplane form as an effect of a predetermined form to the target image, as in FIG. 2.

The effect control device according to this embodiment specifies the volume corresponding to the sound indicated by the information regarding the direction of the sound based on the information regarding the volume. Further, the effect control device according to this embodiment adds, to the target image, the effect (which is an example of an effect of a predetermined form) of the airplane form of a size corresponding to the specified volume.

Here, for example, the effect control device according to this embodiment specifies a magnitude of the effect corresponding to the volume indicated by the information regarding the volume on the basis of a lookup table in which the volumes and the effects are associated with each other. Then, for example, the effect control device according to this embodiment adds the effect based on the information indicating the direction of the sound and the information indicating the volume to the target image by resizing the effect image indicated by the effect image data to the specified magnitude of the effect and combining the resized effect image with the target image.

For example, as illustrated with reference to FIG. 4, the effect control device according to this embodiment adds, to the target image, the effect based on the direction of the sound indicated by the information regarding the direction of the sound and the volume indicated by the information regarding the volume. For example, by adding the effect, as illustrated in FIG. 4, to the target image, the user viewing the target image to which the effect is added can visually recognize the direction of the sound and the magnitude of the sound (the volume) due to the effect added to the target image. In the effect control device according to this embodiment, the process based on the information regarding the direction of the sound and the information regarding the volume is not, of course, limited to the process described above, and the example in which the effect based on the direction of the sound indicated by the information regarding the direction of the sound and the volume indicated by the information regarding the volume is added to the target image is not, of course, limited to the example illustrated in FIG. 4.

(5) Other Examples

The process relevant to the effect control method in the effect control device according to this embodiment is not limited to the process described above in the first example to the process described above in the fourth example. For example, the effect control device according to this embodiment may control the effect added to the target image based on two or more pieces of information among the information regarding the direction of the sound, the information regarding the position of the sound, the information regarding the frequency of the sound, and the information regarding the volume. For example, the effect control device according to this embodiment can combine any combinable processes such as "the process relevant to the above-described second example and the process relevant to the above-described third example," "the process relevant to the above-described second example and the process relevant to the above-described fourth example," "the process relevant to the above-described third example and the process relevant to the above-described fourth example," and "the process relevant to the above-described second example, the process relevant to the above-described third example, and the process relevant to the above-described fourth example."

The effect control device according to this embodiment performs, for example, the processes described above in (1) to (5) as the process relevant to the effect control method according to this embodiment. Here, for example, the effect control device according to this embodiment controls the effect added to the target image based on the information regarding the direction of the sound or based on at least one piece of information among the information regarding the direction of the sound, the information regarding the position of the sound, the information regarding the frequency of the sound, and the information regarding the volume.

Accordingly, the effect control device according to this embodiment can add the effect based on the sound to the target image.

For example, as described above, the effect control device according to this embodiment adds the effect to the target image based on the information regarding the sound, such as the information regarding the direction of the sound and the like. Accordingly, the user viewing the target image to which the effect is added can visually recognize "the direction of the sound" or "at least one of the direction of the sound, the position of the sound, the pitch of the sound (or the frequency of the sound), and the magnitude of the sound (the volume)" due to the effect added to the target image.

Further, the effect control device according to this embodiment adds the effect based on the sound to the target image, that is, superimposes the information regarding the sound on the image. Accordingly, compared to an experience in which information regarding a sound is provided by the sound, the user viewing the target image to which the effect is added can feel a more realistic experience.

(Effect Control Device According to Embodiment)

Next, an example of the configuration of the effect control device of this embodiment capable of performing the process relevant to the effect control method according to the above-described embodiment will be described.

Figure 5:
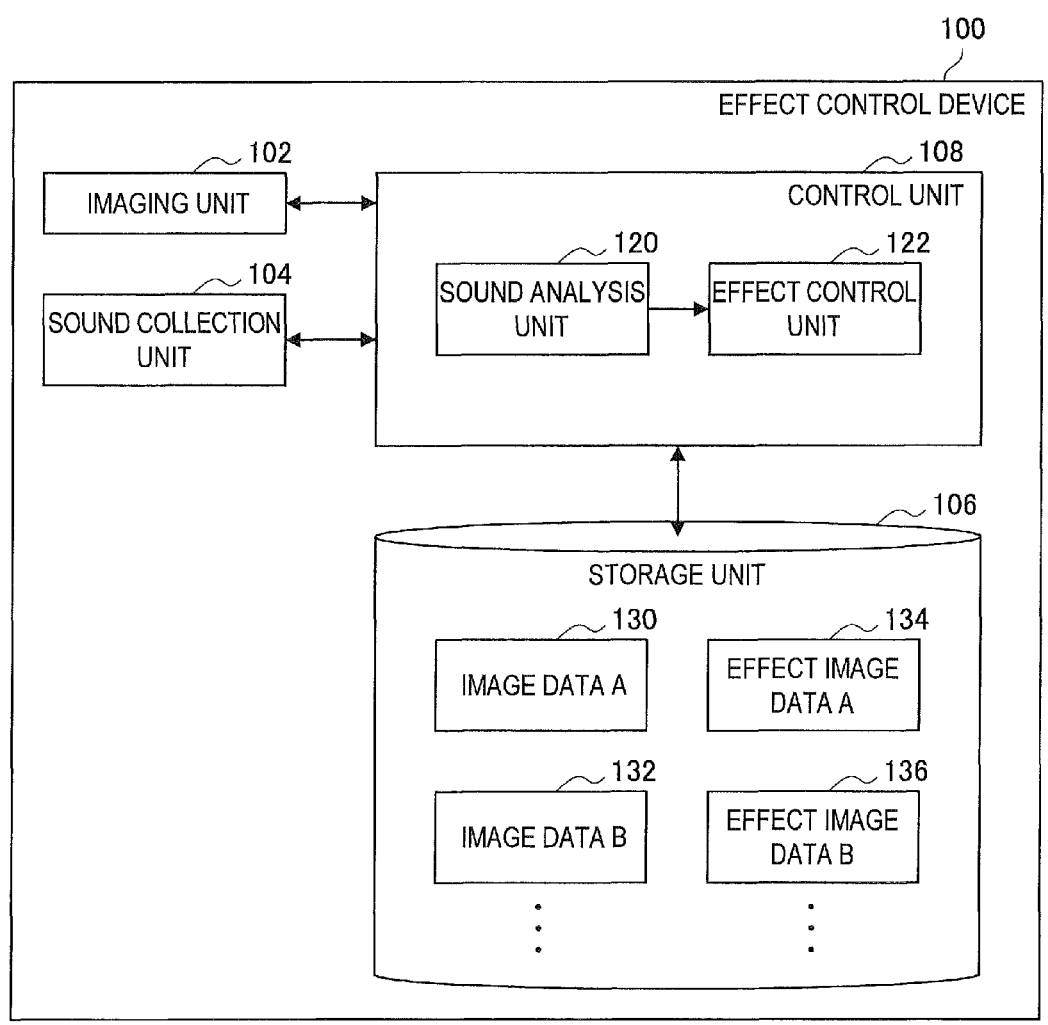
FIG. 5 is a block diagram illustrating an example of the configuration of the effect control device according to the embodiment.

FIG. 5 is a block diagram illustrating an example of the configuration of an effect control device 100 according to this embodiment.

For example, the effect control device 100 includes an imaging unit 102, a sound collection unit 104, a storage unit 106, and a control unit 108.

For example, the effect control device 100 may further include a read-only memory (ROM) (not illustrated), a random access memory (RAM) (not illustrated), a communication unit (not illustrated), an operation unit (not illustrated) that is able to be operated by a user, and a display unit (not illustrated) that displays various screens on a display screen. In the effect control device 100, for example, the constituent elements are connected via a bus serving as a data transmission path.

Here, the ROM (not illustrated) stores a program used by the control unit 108 or control data such as arithmetic parameters. The RAM (not illustrated) temporarily stores a program or the like executed by the control unit 108.

The communication unit (not illustrated) is a communication unit included in the effect control device 100 and performs wired or wireless communication with an external device such as a server, an imaging device, or a display device via a network (or directly). Here, an example of the communication unit (not illustrated) includes a communication interface to be described below. Examples of the network according to this embodiment include a wired network such as a LAN or a Wide Area Network (WAN), a wireless network such as a wireless local area network (WLAN) or a wireless WAN (WWAN) connected with a base station, and the Internet using a communication protocol such as the transmission control protocol/Internet protocol (TCP/IP).

An example of the operation unit (not illustrated) includes an operation input device to be described below. An example of the display unit (not illustrated) includes a display device to be described below.

[Example of Hardware Configuration of Effect Control Device 100]

Figure 6:
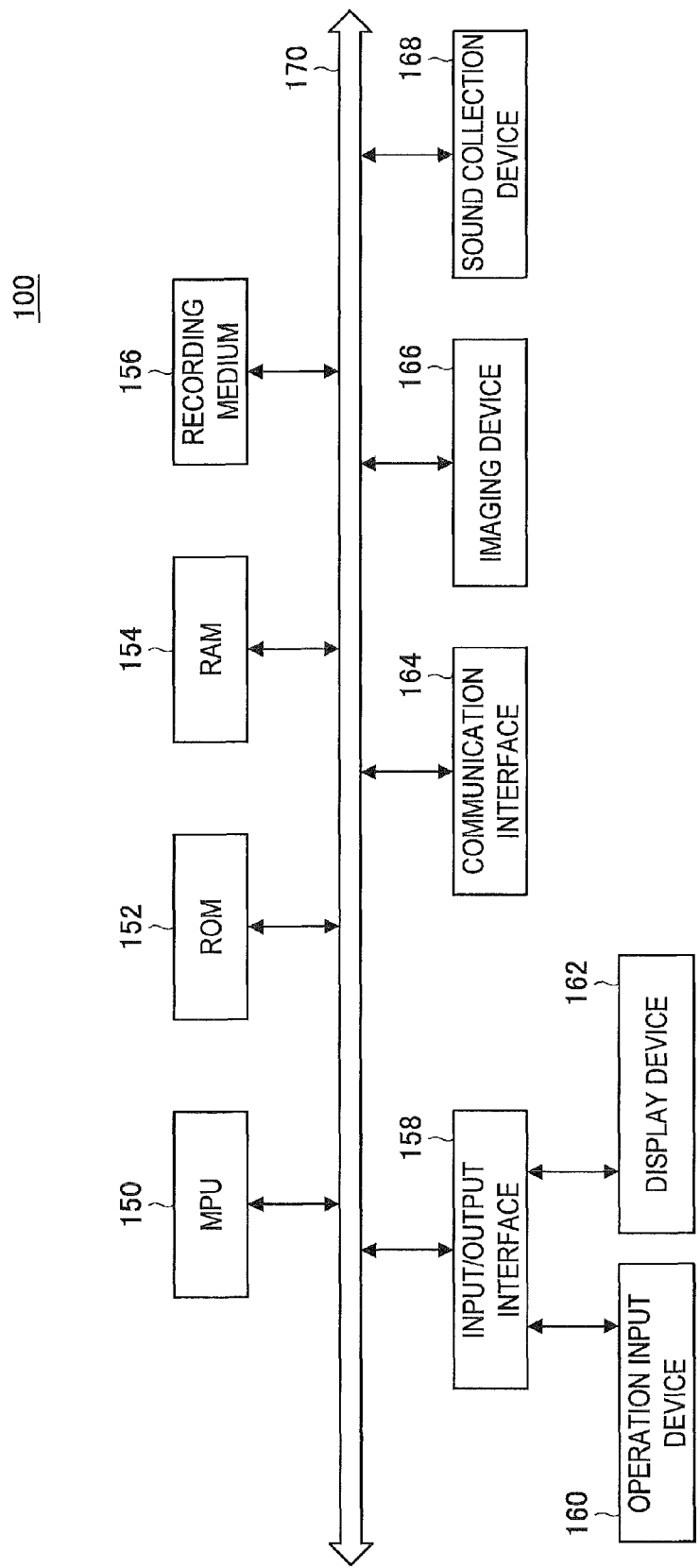
FIG. 6 is a diagram illustrating an example of a hardware configuration of the effect control device according to the embodiment.

FIG. 6 is a diagram illustrating an example of a hardware configuration of the effect control device 100 according to this embodiment. For example, the effect control device 100 includes an MPU 150, a ROM 152, a RAM 154, a recording medium 156, an input/output interface 158, an operation input device 160, a display device 162, a communication interface 164, an imaging device 166, and a sound collection device 168. In the effect control device 100, for example, the constituent elements are connected by a bus 170 serving as a data transmission path.

The MPU 150 includes, for example, a micro processing unit (MPU) or various processing circuits and functions as the control unit 108 that controls the entire effect control device 100. For example, the MPU 150 fulfills the roles of a sound analysis unit 120 and an effect control unit 122 to be described below in the effect control device 100.

The ROM 152 stores a program used by the MPU 150, control data such as arithmetic parameters, or the like. For example, the RAM 154 temporarily stores the program executed by the MPU 150.

The recording medium 156 functions as the storage unit 106 and stores, for example, various kinds of data such as image data (for example, data indicating an image to which an effect is not added or data indicating an image to which an effect is added), effect image data, and an application. Here, examples of the recording medium 156 include a magnetic recording medium such as a hard disk and a non-volatile memory such as an electrically erasable and programmable read-only memory (EEPROM) or a flash memory. The recording medium 156 may be detachably mounted on the effect control device 100.

For example, the input/output interface 158 connects the operation input device 160 or the display device 162. The operation input device 160 functions as an operation unit (not illustrated) and the display device 162 functions as a display unit (not illustrated). Here, examples of the input/output interface 158 include a universal serial bus (USB) terminal, a digital visual interface (DVI) terminal, a high-definition multimedia interface (HDMI) terminal, and various processing circuits. For example, the operation input device 160 can be provided on the effect control device 100 and is connected to the input/output interface 158 inside the effect control device 100. Examples of the operation input device 160 include a button, a direction key, a rotation-type selector such as a jog dial, and combinations thereof. For example, the display device 162 can be provided on the effect control device 100 and is connected to the input/output interface 158 inside the effect control device 100. Examples of the display device 162 include a liquid crystal display, an organic electro-luminescence (EL) display, and an organic light emitting diode display (OLED display).

The input/output interface 158 can, of course, be connected to an operation input device (for example, a keyboard or a mouse) which is an external device of the effect control device 100 or an external device such as a display device or an imaging device. The display device 162 may be, for example, a device such as a touch screen on which display and a user's operation can be performed.

The communication interface 164 is a communication unit included in the effect control device 100 and functions as a communication unit (not illustrated) that performs wired/wireless communication with an external device such as an imaging device, a display device, or a server via a network (or directly). Here, examples of the communication interface 164 include a communication antenna, an RF circuit, and a LAN terminal, and a transmission and reception circuit. For example, the communication interface 164 can have a configuration of a USB terminal, a transmission and reception circuit, and the like corresponding to any standard capable of performing communication or any configuration capable of performing communication with an external device via a network.

The imaging device 166 is an imaging unit included in the effect control device 100 and fulfills the role of the imaging unit 102 that performs imaging and generates image data indicating a captured image. Examples of the imaging device 166 include a lens/imaging element and a signal processing circuit. For example, the lens/imaging element includes a lens of an optical system and an image sensor in which a plurality of imaging elements such as complementary metal oxide semiconductors (CMOS) are used. For example, the signal processing circuit includes an automatic gain control (AGC) circuit or an analog-to-digital converter (ADC) and performs various kinds of signal processing by converting an analog signal generated by the imaging element into a digital signal (image data). Examples of the signal processing performed by the signal processing circuit include a white balance correction process, a color correction process, a gamma correction process, a YCbCr conversion process, and an edge enhancement process.

The sound collection device 168 is a sound collection unit included in the effect control device 100 and fulfills the role of the sound collection unit 104 that generates a sound signal indicating the collected sound. An example of the sound collection device 168 includes a device such as a plurality of microphones or an array microphone capable of generating a sound signal configured to specify the position of a sound.

The effect control device 100 has, for example, the configuration illustrated in FIG. 6 and performs the process relevant to the effect control method according to this embodiment.

The hardware configuration of the effect control device 100 according to this embodiment is not limited to the configuration illustrated in FIG. 6. For example, the effect control device 100 may further include a digital signal processor (DSP) and a sound output device fulfilling the role of a sound output unit (not illustrated) that outputs a sound. Examples of the sound output device according to this embodiment include an amplifier and a speaker.

The effect control device 100 may not include the imaging device 166, when a captured image captured by an external imaging apparatus or an external imaging device is a target image.

The effect control device 100 may not include the sound collection device 168, for example, when performing a sound analysis process on a sound signal generated by an external sound collection apparatus or an external sound collection device or when adding, to a target image, an effect corresponding to a sound indicated by a sound signal generated by an external sound collection apparatus or an external sound collection device.

The effect control device 100 may not include the communication interface 164, for example, when the effect control device 100 performs a process as a stand-alone device. Further, the effect control device 100 can have a configuration in which the operation input device 160 or the display device 162 is not included.

Referring again to FIG. 5, an example of the configuration of the effect control device 100 will be described. The imaging unit 102 performs imaging and generates image data indicating a captured image. Examples of the imaging unit 102 include a lens/imaging element and a signal processing circuit.

The sound collection unit 104 generates a sound signal indicating the collected sound. Examples of the sound collection unit 104 include a sound collection device, such as a plurality of microphones or an array microphone, capable of generating a sound signal configured to specify the position of a sound.

For example, the storage unit 106 stores various kinds of data such as image data (for example, data indicating an image to which an effect is not added or data indicating an image to which an effect is added), effect image data, and an application. Here, FIG. 5 illustrates an example in which the storage unit 106 stores image data A130, image data B132, and the like and effect image data A134, effect image data B136, and the like.

Examples of the storage unit 106 include a magnetic recording medium such as a hard disk and a non-volatile memory such as a flash memory. The storage unit 106 may be detachably mounted on the effect control device 100.

The control unit 108 includes, for example, an MPU and fulfills the roll of controlling the entire effect control device 100. Further, the control unit 108 includes, for example, the sound analysis unit 120 and the effect control unit 122 and initiatively fulfills a role of performing the sound analysis process according to this embodiment and the process relevant to the effect control method according to this embodiment.

The sound analysis unit 120 initiatively fulfills the role of performing the sound analysis process according to this embodiment, and thus analyzes the sound signal and acquires information regarding the direction of a sound. Here, examples of the sound signal analyzed by the sound analysis unit 120 include a sound signal transmitted from the sound collection unit 104 and a sound signal generated by an external sound collection appliance or an external sound collection device.

The information regarding the sound acquired by analyzing the sound signal by the sound analysis unit 120 is not limited to the information regarding the direction of a sound. For example, the sound analysis unit 120 can further acquire at least one of information regarding the position of the sound, information regarding the frequency of the sound, and information regarding a volume by analyzing the sound signal.

The effect control unit 122 initiatively fulfills the role of performing the process relevant to the effect control method according to this embodiment, and thus controls an effect added to a target image based on the information regarding the direction of a sound. For example, based on the information regarding the direction of the sound, the effect control unit 122 controls an effect added to a target image by combining an effect image with the target image.

The process performed by the effect control unit 122 is not limited to the process of adding an effect to a target image based on the information regarding the direction of a sound. As described above, the effect control device according to this embodiment can perform, for example, the processes described above in (1) to (5) as the process relevant to the effect control method according to this embodiment. Accordingly, for example, the effect control unit 122 may control an effect added to a target image based on the information regarding the direction of a sound or based on at least one of the information regarding the direction of the sound, information regarding the position of the sound, the information regarding the frequency of a sound, and the information regarding a volume.

Here, for example, the effect control unit 122 performs the process based on information regarding sound such as information transmitted from the sound analysis unit 120 and indicating the direction of a sound. When the sound analysis unit 120 performs the sound analysis process according to this embodiment on the sound signal transmitted from the sound collection unit 104, the effect control unit 122 controls the effect added to the target image based on the information regarding the sound, such as the information regarding the direction of the sound, which corresponds to the sound indicated by the sound signal transmitted from the sound collection unit 104.

The information regarding the sound used in the process by the effect control unit 122 is not limited to the information transmitted from the sound analysis unit 120. For example, the effect control unit 122 can perform the process based on information regarding a sound which is transmitted from an external device that performs the sound analysis process according to this embodiment and is received by the communication unit (not illustrated).

For example, the effect control unit 122 sets a captured image indicated by imaged data transmitted from the imaging unit 102 to the target image, but the target image to which the effect is added by the effect control unit 122 is not limited to the above target image. For example, the effect control unit 122 may set, as the target image, an image indicated by image data stored in the storage unit 106, an image indicated by image data stored in an external device such as a server and acquired via the communication unit (not illustrated), or a captured image indicated by imaged data acquired from an external imaging appliance or an external imaging device.

As described above, for example, the effect control unit 122 controls the effect added to the target image by combining the effect image with the target image based on the information regarding a sound, such as information regarding the direction of the sound.

The process performed by the effect control unit 122 is not limited to the above-described process.

For example, the effect control unit 122 may further perform a display control process of displaying an image obtained by combining the effect image with the target image on a display screen. Here, examples of the display screen on which the image obtained by combining the effect image with the target image is displayed by the effect control unit 122 include a display screen of an external display device and a display screen of a display unit (to be described below) when the display unit (to be described below) included in the effect control device according to this embodiment.

When the image obtained by combining the effect image with the target image is displayed on the display screen of the external display device, for example, the effect control unit 122 displays the combined image on the display screen by transmitting image data (or an analog signal indicating the combined image) indicating the combined image and a processing command used to perform a process relevant to the display on the external display device to the external display device via the communication unit (not illustrated).

When the image obtained by combining the effect image with the target image is displayed on the display screen of the display unit (to be described below), for example, the effect control unit 122 displays the combined image on the display screen by transmitting image data (or an analog signal indicating the combined image) indicating the combined image to the display unit (not illustrated).

The effect control unit 122 may further perform a recording control process of storing the image data indicating the image obtained by combining the effect image with the target image in a recording medium. By storing the image which is obtained by combining the effect image with the target image and is an image in which a sound is visualized in the recording medium, a more realistic image than an image in which the sound is visualized is stored in the recording medium. Further, an example of the image data stored in the recording medium by the effect control unit 122 may include a sound signal indicating the sound corresponding to the information regarding the sound and used for the process relevant to the effect control method according to this embodiment by the effect control unit 122.

Here, examples of the recording medium in which the image data indicating the image obtained by combining the effect image with the target image is recorded by the effect control unit 122 include the storage unit 106, an external recording medium in which data can be written by the effect control device, and an external device such as a server capable of performing communication with the effect control device. When the image data indicating the image obtained by combining the effect image with the target image is recorded in the external recording medium or the external device such as a server, the image data indicating the combined image is stored in the external recording medium or the external device by transmitting the image data (or an analog signal indicating the combined image) indicating the combined image and a processing command used to cause the external recording medium or the external device to perform a process relevant to the recording to the external recording medium or the external device via the communication unit (not illustrated).

For example, the control unit 108 includes the sound analysis unit 120 and the effect control unit 122, and thus initiatively fulfills the sound analysis process according to this embodiment and the process relevant to the effect control method according to this embodiment.

The configuration of the control unit according to this embodiment is not limited to the configuration illustrated in FIG. 5. For example, the control unit according to this embodiment may not include the sound analysis unit 120. Even when the control unit does not include the sound analysis unit 120, the effect control unit 122 can perform the process relevant to the effect control method according to this embodiment based on the information regarding the sound which is received by the communication unit (not illustrated) and is transmitted from the external device performing the sound analysis process according to this embodiment.

Since the effect control device 100 has, for example, the configuration illustrated in FIG. 5, the effect control device 100 performs the process relevant to the effect control method according to this embodiment. Accordingly, since the effect control device 100 has, for example, the configuration illustrated in FIG. 5, the effect control device 100 can add the effect based on the sound to the target image.

The configuration of the effect control device according to this embodiment is not limited to the configuration illustrated in FIG. 5. For example, the effect control device according to this embodiment can include one or both of the sound analysis unit 120 and the effect control unit 122, which form the control unit according to this embodiment, separately (for example, each is realized by a separate processing circuit).

The effect control device according to this embodiment may not include, for example, the sound analysis unit 120, as described above. Even when the effect control device does not include the sound analysis unit 120, for example, the effect control device according to this embodiment can perform the process relevant to the effect control method according to this embodiment based on the information regarding the sound which is received by the communication unit (not illustrated) and is transmitted from the external device performing the sound analysis process according to this embodiment.

The effect control device according to this embodiment may not include, for example, the imaging unit 102. Even when the effect control device does not include the imaging unit 102, for example, as described above, the effect control device according to this embodiment can perform the process relevant to the effect control method according to this embodiment on an image indicated by the image data stored in the storage unit 106, an image indicated by the acquired image data stored in an external device such as a server, or a captured image indicated by the imaged data acquired from an external imaging appliance or an external device as the target image.

The effect control device according to this embodiment may not include, for example, the sound collection unit 104. Even when the effect control device does not include the sound collection unit 104, for example, as described above, the effect control device according to this embodiment can perform the sound analysis process according to this embodiment on the sound signal generated by an external sound collection appliance or an external sound device as a processing target.

The effect control device according to this embodiment may include, for example, a display unit (not illustrated). When the effect control device includes the display unit (not illustrated), for example, the effect control device according to this embodiment can display the image combined by the effect control unit 122 on a display screen of the display unit (not illustrated).

The effect control device according to this embodiment may include, for example, a sound output unit (not illustrated) capable of outputting a sound.

Thus, the effect control device according to this embodiment controls the effect added to the target image as the process relevant to the effect control method according to this embodiment, for example, based on the information regarding the direction of a sound or based on at least one of the information regarding the direction of the sound, the information regarding the position of a sound, the information indicating the frequency of the sound, and the information regarding a volume.

Thus, the effect control device according to this embodiment can add the effect based on the sound to the target image.

Since the effect control device according to this embodiment adds the effect to the target image based on the information regarding the sound, such as the information regarding the direction of a sound, the user viewing the target image to which the effect is added can visually recognize "the direction of the sound" or at least one of "the direction of the sound, the position of the sound, the pitch of the sound (or the frequency of the sound), and the magnitude of the sound (volume)."

Since the effect control device according to this embodiment adds the effect based on the sound to the target image, that is, superimposes the information regarding the sound on the image, the user viewing the target image to which the effect is added can feel a more realistic experience than an experience in which only the information regarding the sound is provided only by the sound.

As described above, the effect control device according to this embodiment has been described, but this embodiment is not limited to the above-described form. For example, the embodiment can be applied to various devices capable of processing an image, such as an imaging device such as a digital camera or a digital video camera, a communication device such as a portable telephone or a smartphone, a video/music reproduction device (or a video/music recording reproduction device), a computer such as a personal computer (PC) or a server, and a display device such as a television receiver. For example, the embodiment can be applied also to a processing integrated circuit (IC) which can be embedded in the above-mentioned devices.

The sound analysis process according to this embodiment and the process relevant to the effect control method according to this embodiment may be realized by an effect control system including a plurality of devices on the assumption of connection to a network (or communication between the devices) such as cloud computing.

(Program According to Embodiment)

The effect based on the sound can be added to the target image by causing the computer to execute a program (for example, a program capable of executing the process relevant to the effect control method according to this embodiment) causing the computer to function as the effect control device according to this embodiment.

It should be understood by those skilled in the art that various modifications, combinations, sub-combinations and alterations may occur depending on design requirements and other factors insofar as they are within the scope of the appended claims or the equivalents thereof.

For example, the program (computer program) causing the computer to function as the effect control device according to this embodiment has been provided, but a recording medium storing the program may be also provided in this embodiment.

The above-described configurations are merely examples of this embodiment and, of course, pertain to the technical range of the present disclosure.

Additionally, the present technology may also be configured as below.

(1) An effect control device including:
an effect control unit that controls an effect added to a target image based on information regarding a direction of a sound.

(2) The effect control device according to (1), wherein the effect control unit adds an effect based on a direction of a sound indicated by the information regarding a direction of a sound to the target image.

(3) The effect control device according to (1) or (2), wherein the effect control unit adds an effect of a predetermined form to the target image.

(4) The effect control device according to (3), wherein, based on class information regarding a class of a sound corresponding to the information regarding a direction of a sound, the effect control unit adds an effect of a form corresponding to a class of a sound indicated by the class information to the target image.

(5) The effect control device according to any one of (1) to (4), wherein the effect control unit further controls an effect added to a target image based on information regarding a position of a sound.

(6) The effect control device according to (5), wherein the effect control unit adds an effect to a position which is present in the target image and corresponds to a position of a sound indicated by the information regarding a position of a sound.

(7) The effect control device according to any one of (1) to (6), wherein the effect control unit further controls an effect added to a target image based on information regarding a volume.

(8) The effect control device according to (7), wherein the effect control unit adds an effect of a magnitude corresponding to a volume indicated by the information regarding a volume to the target image.

(9) The effect control device according to any one of (1) to (8), wherein the effect control unit further controls an effect added to a target image based on information regarding frequency of a sound.

(10) The effect control device according to (9), wherein the effect control unit adds an effect of a color corresponding to each frequency of a sound indicated by the information regarding frequency of a sound to the target image.

(11) The effect control device according to any one of (1) to (10), further including:
a sound analysis unit that acquires the information regarding a direction of a sound by analyzing a sound signal.

(12) The effect control device according to any one of (1) to (11), further including:
a sound collection unit that generates a sound signal indicating a collected sound,
wherein the effect control unit controls an effect added to a target image based on the information regarding a direction of a sound corresponding to a sound indicated by the sound signal.

(13) An effect control method including:
controlling an effect added to a target image based on information regarding a direction of a sound.

(14) A program causing a computer to perform:
controlling an effect added to a target image based on information regarding a direction of a sound.

The present disclosure contains subject matter related to that disclosed in Japanese Priority Patent Application JP 2012-133787 filed in the Japan Patent Office on Jun. 13, 2012, the entire content of which is hereby incorporated by reference.

What is claimed is:

1. An effect control device comprising:
circuitry configured to control addition of an effect to a target image based on a direction of a sound indicated by information regarding the direction of the sound.

2. The effect control device according to claim 1, wherein the circuitry is configured to control the addition of the effect of a predetermined form to the target image.

3. The effect control device according to claim 2, wherein, based on class information regarding a class of the sound corresponding to the information regarding the direction of the sound, the circuitry is configured to control the addition of the effect of a form corresponding to the class of the sound indicated by the class information to the target image.

4. The effect control device according to claim 1, wherein the circuitry is further configured to control the addition of the effect to the target image based on information regarding a position of the sound.

5. The effect control device according to claim 4, wherein the circuitry is configured to control the addition of the effect to a position which is present in the target image and corresponds to the position of the sound indicated by the information regarding the position of the sound.

6. The effect control device according to claim 4, wherein the position of the sound is based on a position of an object in the target image.

7. The effect control device according to claim 1, wherein the circuitry is further configured to control the addition of the effect to the target image based on information regarding a volume of the sound.

8. The effect control device according to claim 7, wherein the circuitry is configured to control the addition of the effect of a magnitude corresponding to the volume indicated by the information regarding the volume to the target image.

9. The effect control device according to claim 1, wherein the circuitry is further configured to control the addition of the effect to the target image based on information regarding frequency of the sound.

10. The effect control device according to claim 9, wherein the circuitry is configured to control the addition of the effect of a color corresponding to each frequency of the sound indicated by the information regarding frequency of the sound to the target image.

11. The effect control device according to claim 1, wherein the circuitry is further configured to acquire the information regarding the direction of the sound based on an analysis of the sound.

12. The effect control device according to claim 11, wherein the direction of the sound corresponds to a sound collected with the target image.

13. The effect control device according to claim 11, wherein the circuitry is further configured to control display of an image on a display device based on the effect and the target image.

14. An effect control method comprising:
controlling, with circuitry, addition of an effect to a target image based on a direction of a sound indicated by information regarding the direction of the sound.

15. The effect control method according to claim 14, further comprising:
controlling, with the circuitry, display of an image on a display device based on the effect and the target image.

16. The effect control method according to claim 14, further comprising:
acquiring, with the circuitry, the information regarding the direction of the sound based on an analysis of the sound.

17. A non-transitory computer-readable storage medium having stored thereon, a set of computer-executable instructions for causing a computer to perform steps comprising:
controlling, with the computer, addition of an effect to a target image based on a direction of a sound indicated by information regarding the direction of the sound.

18. The non-transitory computer-readable storage medium according to claim 17, further comprising:
controlling, with the computer, display of an image on a display device based on the effect and the target image.

19. The non-transitory computer-readable storage medium according to claim 17, further comprising:
acquiring, with the computer, the information regarding the direction of the sound based on an analysis of the sound.

20. An effect control apparatus comprising:
an image sensor configured to capture an image;
a plurality of microphones configured to generate a sound signal;
a touch screen;
a communication interface having an antenna and an RF circuit for a communication with an external device via a wireless network; and
circuitry configured to control addition of an effect to a target image based on a direction of a sound indicated by information regarding the direction of the sound.

21. The effect control apparatus according to claim 20, wherein the circuitry is configured to control the addition of the effect of a predetermined form to the target image.

22. The effect control apparatus according to claim 21, wherein, based on class information regarding a class of the sound corresponding to the information regarding the direction of the sound, the circuitry is configured to control the addition of the effect of a form corresponding to the class of the sound indicated by the class information to the target image.

23. The effect control apparatus according to claim 20, wherein the circuitry is further configured to control the addition of the effect to the target image based on information regarding a position of the sound.

24. The effect control apparatus according to claim 23, wherein the circuitry is configured to control the addition of the effect to a position which is present in the target image and corresponds to the position of the sound indicated by the information regarding the position of the sound.

25. The effect control apparatus according to claim 23, wherein the position of the sound is based on a position of an object in the target image.

26. The effect control apparatus according to claim 20, wherein the circuitry is further configured to control the addition of the effect to the target image based on information regarding a volume of the sound.

27. The effect control apparatus according to claim 26, wherein the circuitry is configured to control the addition of the effect of a magnitude corresponding to the volume indicated by the information regarding the volume to the target image.

28. The effect control apparatus according to claim 20, wherein the circuitry is further configured to control the addition of the effect to the target image based on information regarding frequency of the sound.

29. The effect control apparatus according to claim 28, wherein the circuitry is configured to control the addition of the effect of a color corresponding to each frequency of the sound indicated by the information regarding frequency of the sound to the target image.

30. The effect control apparatus according to claim 20, wherein the circuitry is further configured to acquire the information regarding the direction of the sound based on an analysis of the sound.

31. The effect control apparatus according to claim 30, wherein the direction of the sound corresponds to a sound collected with the target image.

32. The effect control apparatus according to claim 30, wherein the circuitry is further configured to control display of an image on a display device based on the effect and the target image.

* * * * *